United States Patent [19]

Tetreault

[11] 4,071,198
[45] Jan. 31, 1978

[54] APPARATUS FOR GRANULATING MATERIAL

[75] Inventor: Merritt D. Tetreault, East Douglas, Mass.

[73] Assignee: Amacoil Machinery, Inc., New Rochelle, N.Y.

[21] Appl. No.: 685,641

[22] Filed: May 12, 1976

[51] Int. Cl.$^2$ .................................... B02C 13/286
[52] U.S. Cl. ................................. 241/73; 241/186 A
[58] Field of Search .................... 241/73, 86, 89, 89.2, 241/89.3, 186 A, 222, 247

[56] References Cited

U.S. PATENT DOCUMENTS

| | | | |
|---|---|---|---|
| 3,360,204 | 12/1967 | Merges et al. | 241/73 |
| 3,419,223 | 12/1968 | Morin | 241/73 |
| 3,625,138 | 12/1971 | Shinn | 241/73 |
| 3,672,803 | 6/1972 | Rees | 241/73 |
| 3,756,519 | 9/1973 | Reynolds et al. | 241/73 |
| 3,795,369 | 3/1974 | Moser | 241/73 |
| 3,904,136 | 9/1975 | DeNoyer | 241/186 A |

Primary Examiner—Granville Y. Custer, Jr.
Attorney, Agent, or Firm—Robert T. Tobin

[57] ABSTRACT

An auger feed granulator having a cutting chamber, the cutting chamber having a rotating knife assembly which traces a cutting circle which intersects the envelope defined by the auger. The rotating knife assembly engages and removes material carried into the cutting chamber by the auger. The knife assembly axis is offset from the auger axis. Stationary knives are provided adjacent the rotating knife assembly, as well as a removable screen having a selected mesh size which coacts with the rotating knives to determine the granule size of the material which exits from the machine. The screen is mounted on one side of the granulator and preferably has a radius of curvature the same as the radius of the circle traced by the rotating knife assembly. Lastly, the granulator is mounted on a base provided with a jack screw for tilting the granulator to any desired position without changing the relationship of the working parts of the granulator to each other.

5 Claims, 5 Drawing Figures

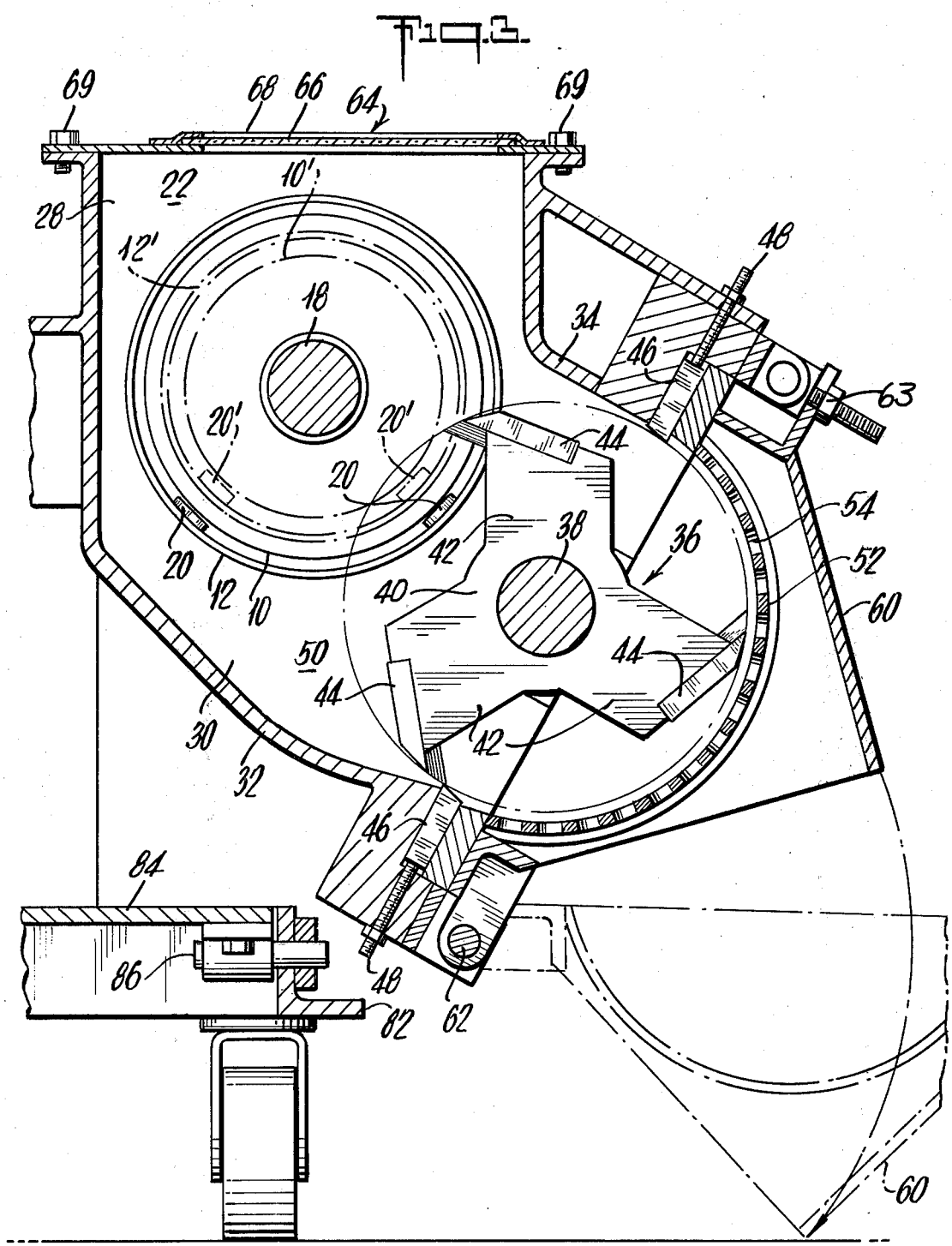

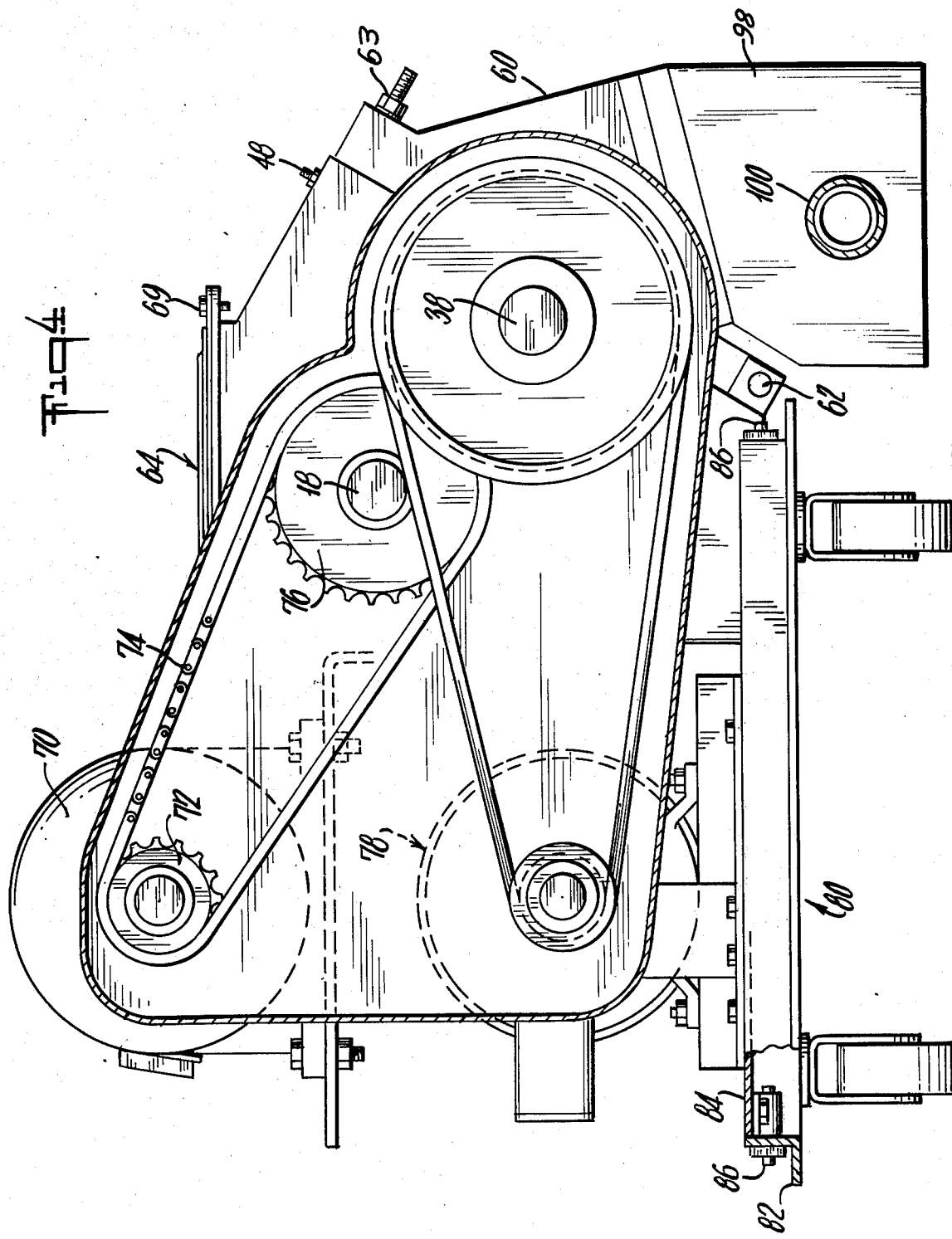

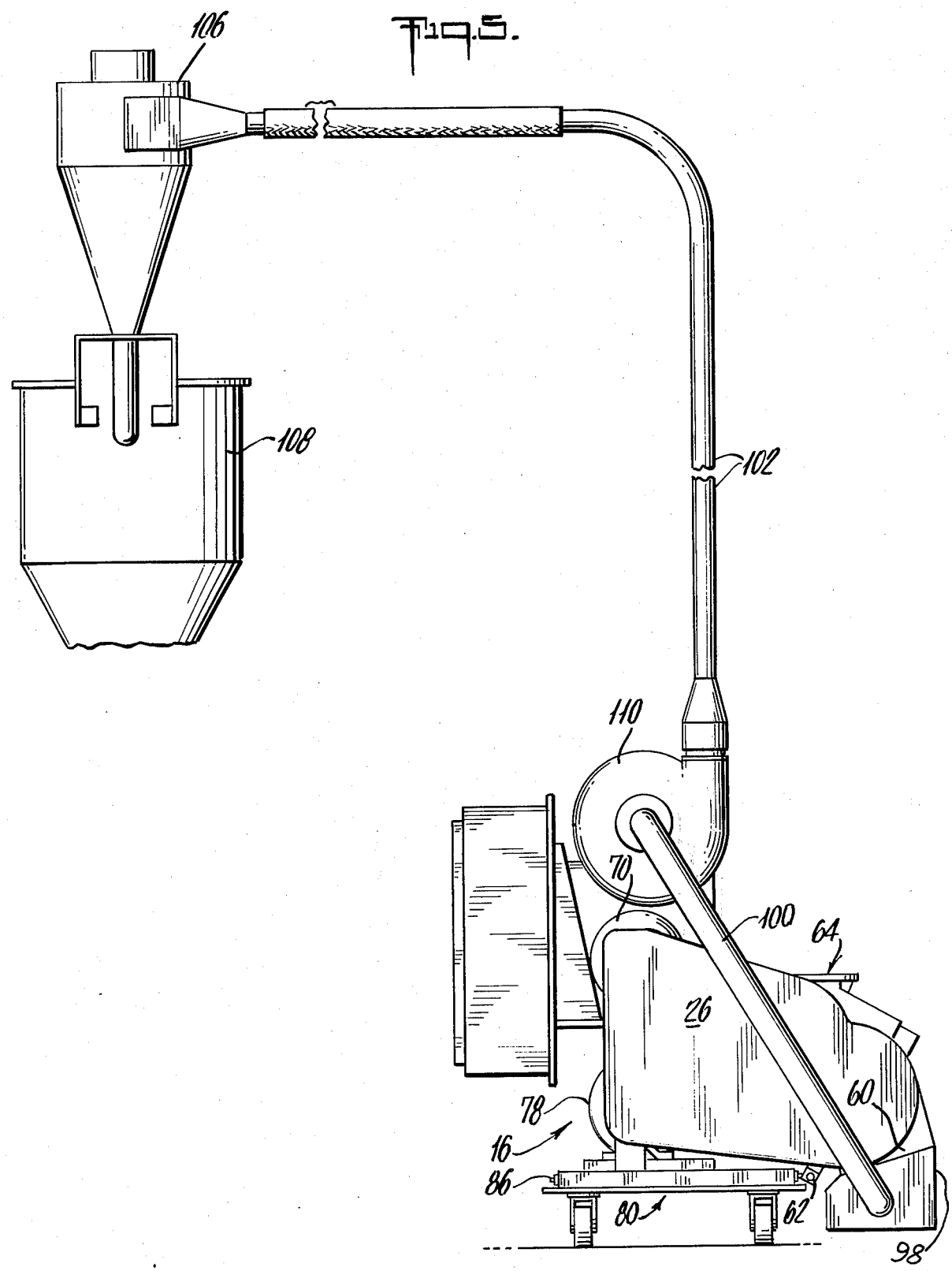

APPARATUS FOR GRANULATING MATERIAL

This invention is directed to auger feed granulators, and more particularly to auger feed granulators useful in granulating hot plastic material just after release from a mold or die.

Conventional auger feed granulators generally comprise a hopper containing an auger which is used to move material directly from a mold or die to the granulator. The granulator is provided with a cutting chamber into which either the auger or the shaft on which it is mounted projects to insure the feed of plastic or other material into the cutting chamber.

The rotatable knife assembly is conventionally positioned below the auger, and a plurality of stationary knives are embedded in the cutting chamber housing adjacent the rotatable knife assembly. The stationary knives coact with the rotating knives and cut or break up material fed to the cutting chamber by the auger.

In the prior art granulators, the rotating knives were generally positioned well below the auger. Plastic material reached the rotating knives only if the material fell from the auger by dint of its own weight.

In addition to the foregoing, the stationary knives mounted on each side of the rotating knife assembly, were generally horizontally aligned and tended to retain plastic material above the rotatable knife assembly. The result was noisy granulator operation and a lower material output than would normally be expected.

Although plastic has been used in the above description as the material for which the granulator is used, it is to be understood that the granulator can be used with any material subject to granulation, such as leather, wood, and nonplastic material.

In the prior art granulators, the auger position has generally been vertically above the rotatable knife assembly. This has occasioned the use of a shallow curvature screen positioned vertically below the rotating knives.

The conventional auger fed granulators described above have proven to be inadequate in many respects. First, when an auger fed granulator is used to feed hot material from the mold or die to the granulator, it has been found that the material, which generally comprises sprues and runners from a multiple cavity die, wraps about the shaft of the auger. Due to the fact that the material is hot, it can readily assume this bent position, wind about the shaft, and in essence remain bound to the shaft by its shape after the material has been advanced into the cutting chamber.

In conventional granulators, the material does not readily release from the shaft. It will often continue to build up on the shaft until the machine jams. When this occurs, it becomes necessary to enter the machine to remove the build up. Removal techniques generally comprise the use of a hack saw or other manually operated cutting means, or the use of fire to burn the material off. Needless to say, the down time occasioned by this mass build up is undesirable and expensive.

The use of a vertical cutting chamber with horizontal stationary knives has another undesirable feature. The action of the rotating knife assembly does little if anything to move the material fed into the granulator to the stationary knives. The material all too often remains trapped above the rotating knife assembly. This material is churned by the rotating knives, resulting in a rather high noise volume. The output of the unit is low and the existance of large amounts of material in the upper portion of the cutting chamber may contribute to the inability of the auger to strip itself of material wrapped about its shaft.

Lastly, the use of a vertical unit tends to result in rather inefficient granulating action between the rotating knife assembly and the screen. Because granulators must be built quite low to the ground, very little room exists underneath the granulator for the installation of a screen. As a result, the radius of curvature of conventional screens has been significantly larger than the radius traced by the knife assembly in the granulator. Since granulator action depends to a great measure on the cutting or crushing action of the rotating knife assembly as it presses and crushes material against the screen, it is apparent that a screen having a larger radius of curvature than the cutting path of the knives premits knife action to be efficient only where the knife assembly is closest to the screen.

A correlative problem is the removal of the material through the screen and into a system for returning the granulated material to the hopper of the molding dye for reuse. Relatively small space exists under the granulator for the installation of a return duct or transition piece. The granulated material must be moved at right angles to the direction in which it is released from the granulator. Build up of material may frequently occur in the duct due to the inability of the small duct size to handle the granulated material which exits through the screen.

The use of a screen located directly under the granulator as described above also makes it rather difficult to install and remove the screen. In addition, the location of this screen directly below the granulator makes it extremely difficult to gain entry to the innards of the granulator for cleaning and servicing.

In accordance with the present invention, an auger fed granulator is disclosed in which the auger shaft continues through the cutting chamber. The lower portion of the cutting chamber contains a rotating knife assembly which is offset to one side of the auger axis. In additon, the cutting path traced by the rotating knife assembly intersects the envelope defined by the auger.

It has been found that offsetting the rotating knife assembly and having its cutting path intersect the auger envelope effectively prevents any material build up from occurring on the shaft of the auger. Hot material fed directly from a conventional mold or die frequently wraps about the shaft of the auger. It has been found that the rotating knives, when positioned to intersect the auger envelope, will contact the material contained on the shaft before any significant amount of build up has occurred. It is believed that the rotating knives grip the material on the auger shaft and pull it down into the cutting chamber where it is subsequently cut or broken up.

In a preferred form of the invention, the auger shaft is placed in the upper portion of the cutting chamber and the rotating knife assembly is placed in the lower portion of the cutting chamber. The lower portion is offset from the upper portion to create a "dog leg" lower portion. At least one stationary knife is mounted in this lower "dog leg" portion which comprises a downwardly sloping wall. Material removed from the auger shaft falls onto the downwardly sloping wall and is moved by gravity, or funneled, to the stationary knife which is mounted in the sloping wall. The rotation of the rotating knife assembly tends to further force the material against the stationary knife, thereby obviating the rather large amount of free floating material encountered with the horizontally positioned knives of the prior art.

In addition to the foregoing, it has been found that the screen through which the granular material is pushed by the rotating knife assembly may be mounted to one side of the unit. In doing so, the radius of curvature of the screen may be made substantially equal to the radius of the cutting path traced by the rotating knife assembly. Sizing or crushing action then occurs in a sizing or crushing region which comprises substantially the entire length of the screen. As a result, the output of the unit is materially increased. In addition to the foregoing, the side mounting of the screen permits easy installation and removal as well as easy access to the interior for cleaning and storage, a feature not found in the prior art vertical units.

In accordance with still another aspect of the present invention, the granulator is mounted on a base plate which is in turn mounted on a dolly. The base plate is pivotable with respect to the dolly to permit the hopper to be lowered or raised in accordance with the height of the mold or die under which the auger is to be placed. Prior art units have generally lacked this feature or provided a pivotable hopper assembly which would result in a change of the angle of the auger with respect to the rotating knife assembly. By pivoting the base plate to which the granulator is mounted, the relationship of the auger to the other operating parts of the granulator remains unchanged.

Referring now to the drawings in which like numerals refer to like parts;

FIG. 3 is a detailed plan view of the internal parts of the granulator taken along line 3—3 of FIG. 2;

FIG. 4 is a front view of the granulator of FIG. 1 showing the drive mechanism therefor taken along line 4—4 of FIG. 2; and FIG. 5 is a schematic view of a return system from the granulator to the hopper for a mold.

Figure 1:
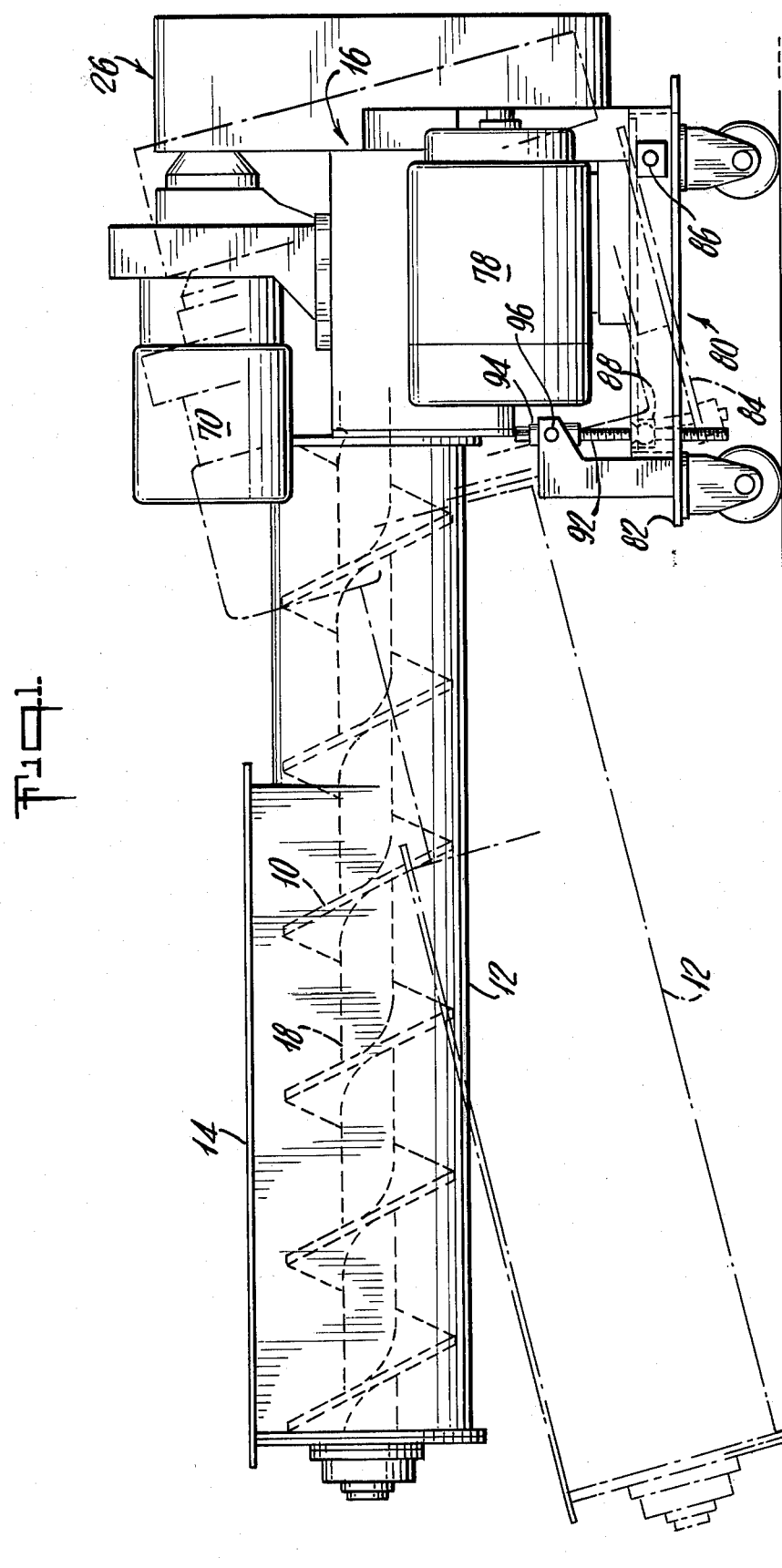
FIG. 1 is a plan view of the granulator.

Referring now to FIG. 1, the numeral 10 denotes an auger mounted in a trough 12 and having a hopper 14 for receiving material released from a molding press or die.

The auger feeds the material directly to the granulator denoted generally by the numeral 16. Preferably, the auger flights are spaced from each other sufficiently to prevent substantial compacting of the plastic or other material as it is fed to the granulator.

The hopper is adapted to receive the unused or waste plastic from the press. The plastic is generally in the form of interconnected sprue and runner assemblies. The size of these assemblies will vary according to the particular molds. These can be large and may frequently tend to wrap about the shaft 18 of the auger as they are fed to the granulator 16.

As shown most clearly in FIG. 3, breaker bars 20 are positioned along the trough 12 in order to keep the material fed to the hopper, which is generally still quite hot, from adhering to the side walls of the trough. Rotation of the auger generally feeds the material into the bottom of the trough adjacent the breaker bars. The rotational force imparted to the material moves it against the breaker bars which serve to prebreak the material, thus serving to prevent the material from adhering to the walls of the trough or jamming the apparatus.

Figure 2:
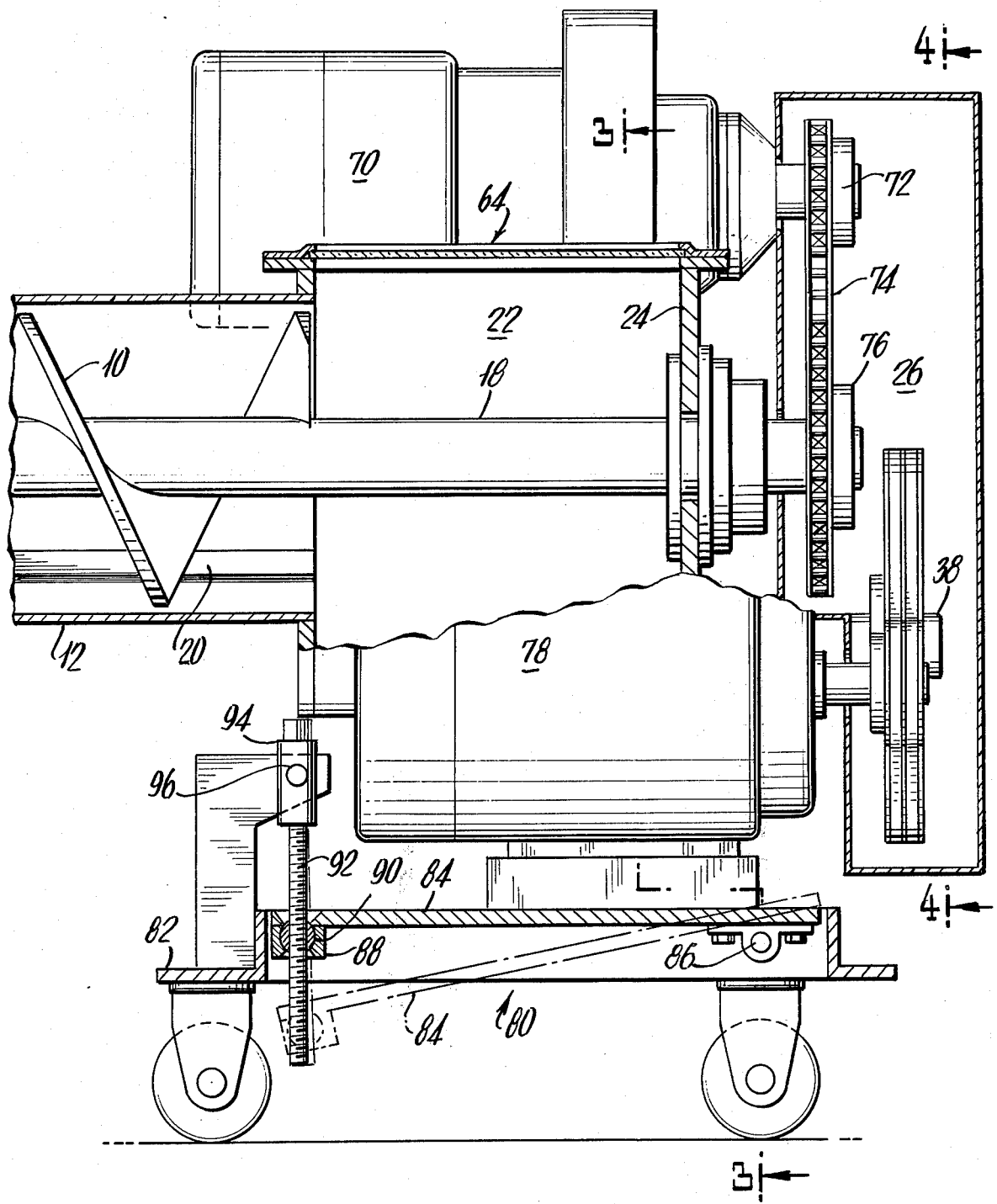
FIG. 2 is a close up view of the auger fed granulator showing the drive means for the granulator.

As can be seen most clearly in FIG. 2, the auger 10 ends adjacent the cutting chamber 22 in the granulator. Auger shaft 18 continues through end wall 24, and terminates in drive means 26. Material fed to the cutting chamber by the auger is moved into the cutting chamber along the shaft 18 by the pushing action of the preceding auger flight.

The cutting chamber is best seen in FIG. 3. Two different sized auger are shown. For commercial units, the smaller auger may generally be six inches in diameter and the larger auger eight inches in diameter, of course, only one auger is present at any one time. Two are shown to illustrate the universal nature of the invention and its ability to adapt to different sized augers without destroying its function. Breaker 20' is used for the narrower trough 12' employed with the six inch whereas breaker 20 is employed with the larger trough 12 employed with the 8 inch auger.

As shown in FIG. 3, the cutting chamber 22 is comprised of an upper portion 28 and a lower portion 30. The lower portion 30 is defined by the angled side walls 32, 34.

The upper housing 28 contains the shaft 18 of the auger whereas the lower housing 30 contains a rotatable knife assembly generally denoted by the numeral 36.

The rotatable knife assembly comprises a shaft 38 to which a rotatable block 40 is fixed for rotation. Three arms 42 are depicted, each arm carrying a knife blade 44 at the edge thereof. The knives are angled with respect to the horizontal as shown in the drawing for purposes to be described below.

The cutting circle traced by the rotating knife assembly intersects the envelope of the auger 10. For an eight inch auger, the envelope diameter will be 8 inches. The envelope will be six inches for a six inch auger. In the preferred embodiment auger 10 does not project into the cutting chamber. However, shaft 18 runs through the cutting chamber and will support or carry forward a substantial amount of the material fed into the cutting chamber by the rotating auger.

It has been found that designing the rotatable knife assembly so that its cutting path intersects the auger envelope tends to insure that the knife will engage and pull off material wrapped about the shaft 18 which would not have released by itself. Buildup on the shaft does not occur, and granulator jamming is prevented. Thus, granulator down time is avoided along with consequent down time of the molds and dies which feed the granulator.

Housing side wall 32 slopes downwardly and to the side of the shaft 18. Positioned along the side wall 32 is a first stationary knife bar 46. The position of the knife bar 46 in the cutting chamber is adjustable via a conventional nut and bolt assembly generally denoted by the numeral 48. It has been found that the clearance between knives 44 on the rotatable assembly and knife bar 46 should preferably be about 0.005 inch to provide for initial crushing of the plastic material. However, spacings greater or smaller than 0.005 inch can be used if desired. Plastic or other material is moved between the stationary and rotating knives and is broken up into smaller fragments. For best results, an additonal bar knife 46 may be positioned directly opposite the first bar knife defining a region between them in which additional cutting, sizing or crushing action can take place as will be described more fully below.

A cutting region 50 is provided which is defined by side wall 32, rotating knife assembly 36, and the bar knife 46. The cutting region decreases in size towards the bar knife 46. Material removed from the shaft 18 tends to accumulate in cutting region 50 and is moved by gravity and by the rotating action of knives 44 down towards the stationary bar knife 46. All material contained in the region 50 tends to be quickly and efficiently moved past the stationary knife 46. Through-put of the granulator is increased over prior art designs in which the stationary knives were placed horizontally and directly beneath the auger feed. In the prior art designs, material tended to remain above the rotating knife assembly, and only the rotating action of the knives could effect movement of the material to the stationary blades. Aside from inefficiency, the prior art units were also quite noisy, whereas the granulator of the present invention is not.

Positioned to one side and comprising the bottom portion of the lower housing is a screen denoted by the numeral 52. The screen is generally made of metal having holes 54 punched or drilled therein, the holes being determined by the size of the granulated material one wishes to remove from the granulator.

The radius of curvature of the screen used in the present invention is substantially the same as the radius of the cutting path of the rotating knife assembly 36. The lower part of the housing which surrounds the screen comprises a boxed-like shaped projection 60; the upper end is removably attached by any suitable means such as the bolt and nut connection 63, preferably on each side of the housing. The box-like shaped projection is pivoted to the lower housing 62 and can be dropped down to the lower dotted line position shown in FIG. 3. With the box-like projection in this position, the screen can be easily and simply removed, thereby allowing access to the entire interior of the granulator. To further aid access to the interior, the top 64 may be made removable by simply removing the plates 66 and 68, which are mounted to the granulator housing by conventional fastening means 69.

Sizing or crushing action occurs between the rotating knives 44 and the screen. As can be readily appreciated, the screen 52 comprises an arc length of approximately 180° and has a radius of curvature substantially the same as the cutting circle traced by the rotating knives 44. Sizing or crushing action between the knives 44 and screen 52 takes place over the entire arc length, or circumference, of the screen. In contrast, the prior art granulators tended to use screens having a shallow curvature. As a result, sizing or crushing action was restricted to the region in which the knives were in close proximity to the screen. Sizing or crushing action provided by screen 52 occurs over a much longer surface, obtained by using a screen having a radius of curvature equal to the cutting path radius of the knives 44.

Two stationary knives or cutting bars 46 have been shown. More or less can be used as desired. In addition, three rotating knives 44 have been shown. Again, more or less can be used as desired.

Referring now to FIG. 4, a conventional drive for the rotating knife assembly and the auger is shown. The auger drive is generally denoted by the numeral 70 and consists of a gear 72 to which a chain 74 is mounted. The chain drives a second gear 76 which in turn drives shaft 18 of the auger assembly.

The rotating knife assembly is driven by a conventional motor denoted by the numeral 78.

The drives described above are conventional and further description is deemed unwarranted.

Referring again to FIGS. 1 and 2, the granulator is seen mounted on a dolly 80 which comprises a mobile base 82. A base plate 84 is pivoted at 86 to the mobile base. A jack screw comprising bushing 90 is pivotally mounted in the bushing 88 which in turn accepts screw 92 therein. The collar 94 is pivotably mounted to arm 96 which is integral with the mobile base.

Rotation of the screw 92 will move the base plate up and down as shown in the drawing in order to reorient the entire granulator with respect to horizontal. This movement is desirable in order to lower the auger and hopper as shown in FIG. 1 in dotted lines to permit positioning of the assembly under "low to the ground" presses.

Referring now to FIG. 5, the box-like shaped projection or cover 60 is shown at one side of the auger fed granulator. A return duct or transition piece 98 is shown which receives material exiting through the screen 52. The material is moved by a conventional fan assembly 110 through duct 100 and into duct 102 for return to feed hopper 106. The feed hopper 106 feeds the material directly into preheat chamber 108 for the mold. In this manner, granulated material which would otherwise be wasted is returned to the molding process.

Many modifications may be made in and to the above-described embodiments by those of ordinary skill in the art to which this invention pertains. It is intended to cover all such modifications which fall within the spirit and scope of the invention as defined in the claims appended hereto.

What is claimed is:

1. In an auger feed granulator, a cutting chamber having an inlet opening in one side wall, a feed hopper, a shaft extending through said opening and supported at one end at said feed hopper and at its other end at the opposite wall of said cutting chamber, an auger mounted on a first portion of said shaft for feeding material from said hopper to said cutting chamber, said auger extending along a substantial length of said shaft, a second portion of said shaft, without said auger mounted thereon, being positioned within said cutting chamber, means for rotating said auger to move material from said feed hopper into said cutting chamber, and means for removing from the second portion of the shaft, sprues and runners of material extruded from the auger, said means comprising a rotatable knife assembly having a plurality of peripherally attached knives, mounted in said cutting chamber, the peripheral cutting path of the attached knives intersecting the auger envelope to remove sprues and runners from the second portion of the shaft.

2. The auger feed granulator recited in claim 1, wherein said rotatable knife assembly is mounted in said cutting chamber adjacent the auger shaft on an axis parallel to said auger shaft.

3. An auger feed granulator according to claim 1 in which the lower end of said cutting chamber is provided with a downwardly sloping wall extending to but spaced from the lower end of said rotatable knife assembly, said wall forming with the upper portion of said chamber an offset discharge opening of substantially the diameter and length of said rotatable knife assembly, and in which the axis of said rotatable knife assembly extends across said opening, in combination with one or more stationary knives mounted adjacent said opening in cutting relationship with said rotatable knife assembly, and a screen of substantially the diameter and length of said rotatable knife assembly covering said opening and positioned adjacent to the knives of said rotatable knife assembly.

4. An auger feed granulator according to claim 1, in combination with a box-like protective cover having an open chute at the bottom, means pivotally mounting the lower edge of said cover to the downwardly sloping wall of said chamber at the edge of said opening, and means detachably fastening the upper edge of said cover to said chamber at the upper edge of said opening.

5. An auger feed granulator according to claim 1 in which the downwardly extending sloping wall and the resulting discharge opening are positioned at substantially right angles to the walls of the chamber supporting said auger shaft and the rotatable knife means.

* * * * *